US005287887A

United States Patent [19]

Hengesbach

[11] Patent Number: 5,287,887

[45] Date of Patent: Feb. 22, 1994

[54] HANDLE OPERATED FLOW CONTROL VALVE

[76] Inventor: Robert W. Hengesbach, 7886 Munson Rd., Mentor, Ohio 44060

[21] Appl. No.: 61,781

[22] Filed: May 14, 1993

[51] Int. Cl.[5] .............. F16K 11/16

[52] U.S. Cl. .............. 137/607; 137/630.22; 239/415; 239/528

[58] Field of Search .............. 137/630.22, 607; 239/415, 528; 261/64.1

[56] References Cited

U.S. PATENT DOCUMENTS

| | | | |
|---|---|---|---|
| D. 308,094 | 5/1990 | Hengesbach | D23/226 |
| D. 318,316 | 7/1991 | Hengesbach | D23/226 |
| 1,382,640 | 6/1921 | Heinrich | 239/415 |
| 1,436,145 | 11/1922 | Birkenmaier | 239/528 |
| 1,940,268 | 12/1933 | Peterson | 91/45 |
| 2,072,555 | 3/1937 | Hengesbach et al. | 122/144 |
| 2,227,161 | 12/1940 | Shelburne | 137/144 |
| 2,293,390 | 8/1942 | Hengesbach | 299/84 |
| 2,639,908 | 5/1953 | Graham | 261/50 |
| 2,717,806 | 9/1955 | Dale | 239/415 |
| 2,804,343 | 8/1957 | Friedell | 299/140 |
| 3,146,952 | 9/1964 | Brady | 239/415 |
| 3,152,607 | 10/1964 | Lundeen | 137/505.13 |
| 3,352,333 | 11/1967 | Glasgow et al. | 141/383 |
| 3,482,740 | 12/1969 | Evans et al. | 222/132 |
| 3,632,046 | 1/1972 | Hengesbach | 239/318 |
| 3,711,028 | 1/1973 | Hengesbach | 239/288.5 |
| 3,727,841 | 4/1973 | Hengesbach | 239/145 |
| 3,756,273 | 9/1973 | Hengesbach | 137/540 |
| 3,896,852 | 7/1975 | Holmes | 137/596 |
| 4,035,004 | 7/1977 | Hengesbach | 285/166 |
| 4,291,706 | 9/1981 | Voges et al. | 128/762 |
| 4,449,696 | 5/1984 | Hengesbach | 251/231 |
| 4,863,068 | 9/1989 | Smith | 137/630.22 X |

*Primary Examiner*—Stephen M. Hepperle
*Attorney, Agent, or Firm*—David A. Burge

[57] ABSTRACT

A handle operated flow control valve has a body that defines first and second spaced inlet passages that extend from spaced first and second inlets and join in the vicinity of a first flow control valve for ducting pressurized flows of fluid from one or both of the inlets into an outlet passage for discharge through a nozzle. The first flow control valve has a first valve stem that moves in response to operation of a trigger handle. When the trigger handle is operated relatively gently within an initial range of movement, only the valve stem of the first flow control valve is moved out of its closed position, whereby a controlled flow of a first fluid such as pressurized water is ducted from the first inlet passage into the outlet passage for discharge. When the trigger handle is more forcefully operated so as to pass through the range of movement that is needed to establish a maximum normal rate of flow of the first fluid through the outlet passage, applying added force to the trigger handle causes the first valve stem to engage and move a second valve stem of a second valve to admit a flow of a second fluid such as pressurized air into the second inlet passage for combination with the flow of the first fluid and for discharge through the outlet passage and through the discharge nozzle. In preferred practice, a check valve is provided to prevent a pressurized flow of the first fluid from backflowing through the second valve.

10 Claims, 8 Drawing Sheets

HANDLE OPERATED FLOW CONTROL VALVE

BACKGROUND OF THE INVENTION

1. Field of the Invention

The present invention relates to a trigger handle operated valve for combining a flow of liquid such as pressurized water with a flow of gas such as pressurized air for discharge through a nozzle. More particularly, the present invention relates to a handle operated flow control valve unit that has aligned first and second valve stems, with the first valve stem being movable in response to handle movement within a first range of motion to establish a controlled flow of a first fluid such as pressurized water, and with the second valve stem being moved by the first valve stem in response to handle movement within a second range of motion to add a flow of a second fluid such as pressurized air to provide a desirably enhanced discharge.

2. Prior Art

Handle operated flow control valves having generally L-shaped bodies that mount spring-biased valve stems for selectively communicating inlet and outlet passages in response to movements of trigger-shaped operating handles are known. Exemplary valves of this type are disclosed in U.S. Pat. Nos. 2,072,555, 2,293,390, 3,632,046, 3,711,028, 3,727,841, 3,756,273, 4,035,004 and 4,449,696 (referred to hereinafter as the "Flow Control Valve Patents"), the disclosures of which are incorporated herein by reference.

Handle operated flow control valves that employ body-carried wire-formed rings to embrace and releasably retain operating handles in "operated" positions are disclosed, for example, in U.S. Pat. Nos. 2,072,555 and 2,293,390. The use of body-carried wire-formed rings both for releasably retaining a handle in an "operated" position and for hanging the valve body from an external support is disclosed, for example, in U.S. Pat. No. 4,449,696.

Handle operated flow control valves that employ reversible, interiorly threaded discharge nozzles for selectively presenting concave and convex screens to cause discharging flows to diverge as a gentle spray or to converge as a forceful single stream are known. Exemplary valves of this type are disclosed, for example, in U.S. Pat. Nos. 2,072,555 and 3,711,028.

While the majority of the patents identified above disclose the use of generally L-shaped bodies that have plug-closed openings through which valve components such as valve stems and springs are installed during assembly of the valves, the use of such an assembly opening to provide an inlet for fluid such as pressurized air is disclosed in U.S. Pat. No. 4,035,004. Other uses to which such assembly openings can be put, for example to mount a pressure gauge, are depicted in Design U.S. Pat. Nos. 308,094 and 318,316, the disclosures of which also are incorporated herein by reference.

A need that is not satisfactorily addressed by the prior art is the provision of a handle operated flow control valve that provides a "single/dual" capability for being used either to provide a controlled discharge of only a single fluid such as pressurized water, or to provide a controlled combined discharge of two fluids that are introduced into the valve body through separate inlets, such as pressurized water and pressurized air. Nor does the prior art satisfactorily address the need that exists for a single/dual flow control valve that permits, by selective manipulation of a single operating handle, the selection of a controlled discharge of a single fluid such as pressurized water, or the combined discharge of a two fluids such as pressurized water and pressurized air.

SUMMARY OF THE INVENTION

The present invention addresses the foregoing and other needs and drawbacks of the prior art by providing a novel and improved handle operated flow control valve for selectively discharging a controlled flow of a single fluid such as pressurized water, or a controlled combined flow of two fluids such as pressurized water and pressurized air.

A feature of the present invention resides in the provision of a single trigger-like operating handle that, if squeezed relatively gently to operate the handle within a first range of movement, will provide a controlled flow of only one fluid such as pressurized water, and that, if squeezed relatively more forcefully to operate the handle within a second range of movement, will provide a pressure-boosted combined flow of two fluids such as pressurized water and pressurized air. In preferred practice, the manner in which this "single/dual" capability is provided is through the use of aligned first and second valve stems, with the first valve stem being movable in response to handle movement within a first range of motion to establish a controlled flow of a first fluid such as pressurized water, and with the second valve stem being moved by the first valve stem in response to handle movement within a second range of motion to add a flow of a second fluid such as pressurized air to provide a desirably enhanced, pressure-boosted discharge.

In preferred practice, a handle operated flow control valve has a body that defines first and second spaced inlet passages that extend from spaced first and second inlets and join in the vicinity of a first flow control valve for ducting pressurized flows of fluid from one or both of the inlets into an outlet passage for discharge through a nozzle. The first flow control valve has a first valve stem that moves in response to operation of a trigger handle. When the trigger handle is operated relatively gently within an initial range of movement, only the valve stem of the first flow control valve is moved out of its closed position, whereby a controlled flow of a first fluid such as pressurized water is ducted from the first inlet passage into the outlet passage for discharge. When the trigger handle is more forcefully operated so as to pass through the range of movement that is needed to establish a maximum normal rate of flow of the first fluid through the outlet passage, applying added force to the trigger handle causes the first valve stem to engage and move a second valve stem of a second valve to admit a flow of a second fluid such as pressurized air into the second inlet passage for combination with the flow of the first fluid and for discharge through the outlet passage and through the discharge nozzle.

In accordance with the most preferred form of practice of the present invention, a handle operated flow control valve of the type described above is provided with a combination check valve and flow control regulator for preventing backflow of the first fluid into a supply line that ducts the second fluid to the valve, and for regulating the rate of flow at which the second fluid can be supplied for combining with the flow of the first fluid. Both backflow prevention and flow rate control are provided by controlling the positioning and range of permitted movement of a single check valve member that can be advantageously aligned with the aforementioned first and second valve stems.

BRIEF DESCRIPTION OF THE DRAWINGS

These and other features, and a fuller understanding of the present invention may be had by referring to the following description and claims, taken in conjunction with the accompanying drawings, wherein:

DESCRIPTION OF THE PREFERRED EMBODIMENT

Figure 1:
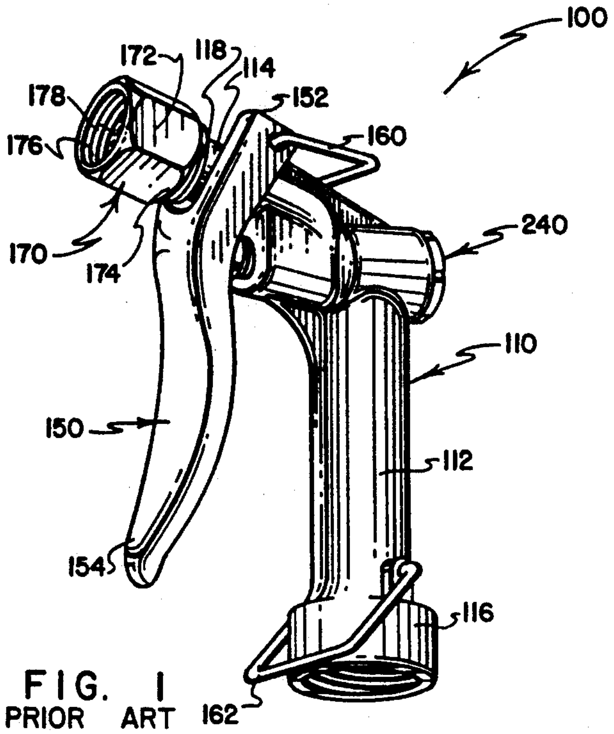
FIG. 1 PRIOR ART
FIG. 1 is a perspective view of a prior art handle operated flow control valve unit, with the view depicting the operating handle of the valve in its normal, "non-operated" position.

In the description that follows, reference will be made to FIGS. 1-3 wherein a prior art handle operated flow control valve 100 is depicted; to FIGS. 4-7 wherein a handle operated flow control valve 100' that embodies selected features of the present invention is depicted; to FIGS. 8-13 wherein a handle operated flow control valve 100" that embodies the preferred practice of the present invention is depicted; and to FIG. 14 wherein components that can be utilized to form both of the valve embodiments 100', 100" are depicted.

While the preferred practice of the present invention and the best mode known for carrying out the preferred practice are embodied in the form of handle operated flow control valve unit 100" that is depicted in FIGS. 8-13, the description that follows begins by discussing features of the prior art embodiment 100, then moves on to the more complex embodiment 100', and deals lastly with the still more complex preferred embodiment 100". To the extent that one or more of the valve embodiments 100, 100', 100" employ components that are completely identical, identical reference numerals are used consistently to indicate these identical components. To the extent that one or more of the valve embodiments 100, 100', 100" employ components that differ a bit in configuration but "correspond" in large measure in the manner in which they function, reference numerals that "correspond" (to the extent that they differ only by the presence or absence of single or double "prime" marks) are used to indicate these corresponding components.

Figure 2:
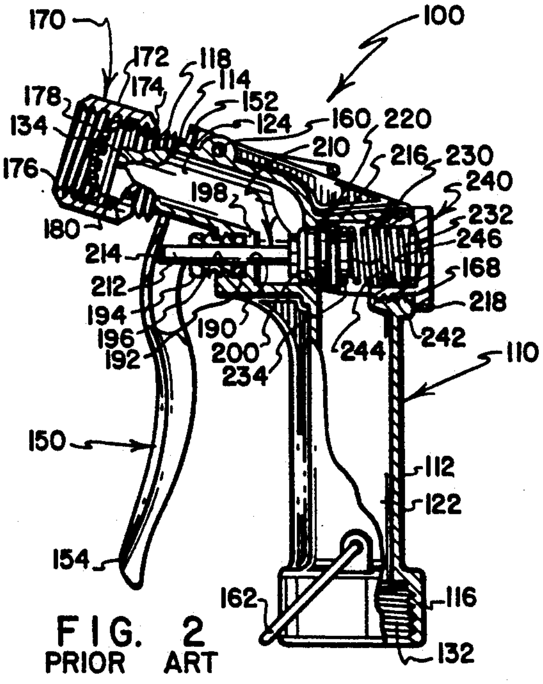
FIG. 2 PRIOR ART
FIG. 2 is a side elevational view of the prior art handle operated flow control valve unit of FIG. 1, but with portions of the valve unit broken away and shown in cross-section, with the operating handle in its normal "non-operated" position, and with the valve unit's discharge nozzle oriented to cause discharging fluid to diverge to form a gentle spray.
Figure 3:
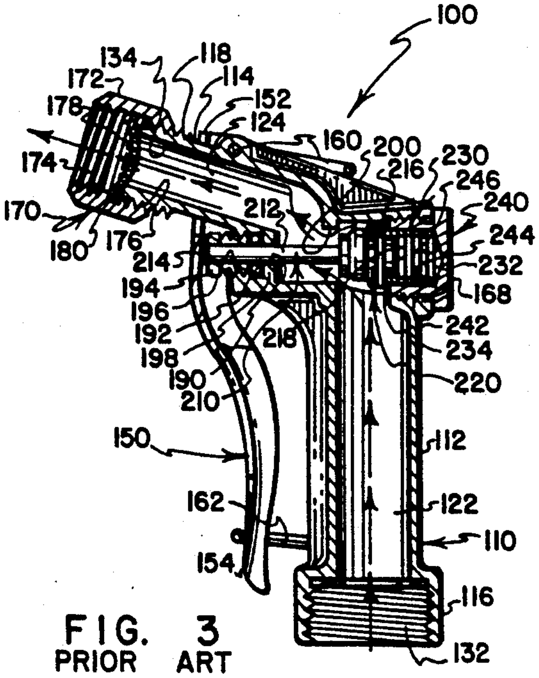
FIG. 3 PRIOR ART
FIG. 3 is a side elevational view of the prior art handle operated flow control valve unit of FIGS. 1 and 2, with portions of the valve unit broken away and shown in cross-section, with the operating handle moved to an "operated" position, with the operating handle being releasably retained in the "operated" position by a wire-formed body-carried ring, and with the valve unit's discharge nozzle oriented to cause discharging fluid to converge to form a single forceful stream.
Figure 4:
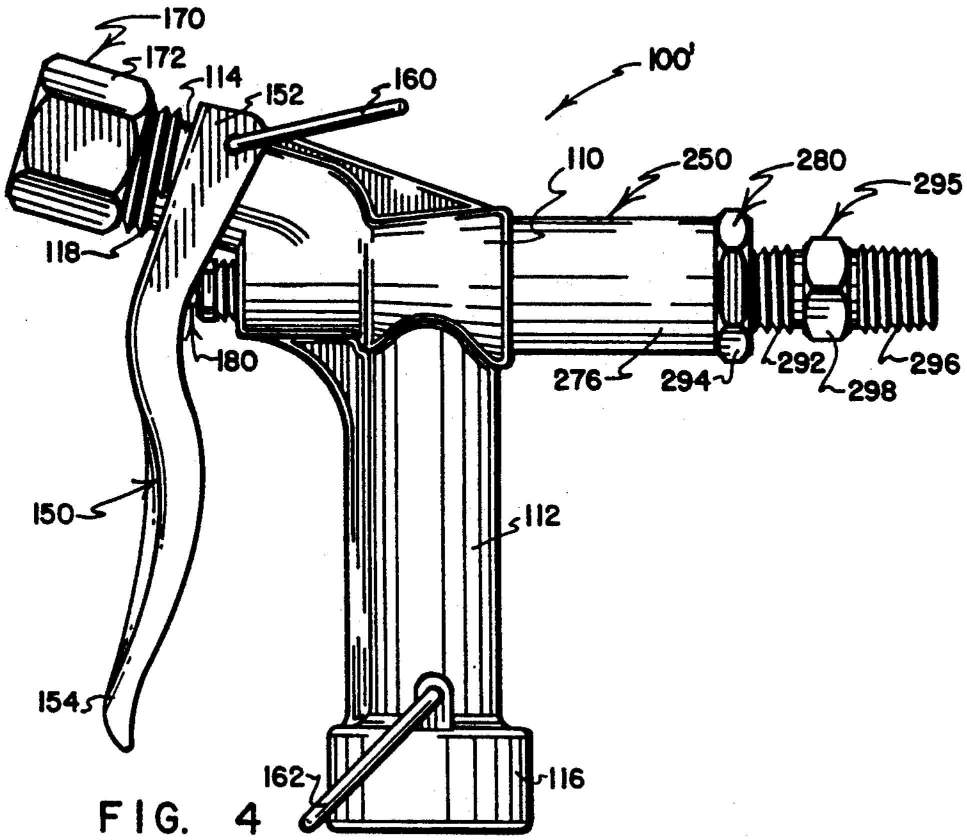
FIG. 4 is a side elevational view of one form of handle operated flow control valve that embodies features of the present invention, with the view depicting the operating handle of the valve in its normal, "non-operated" position.

Referring to FIGS. 1-3, a prior art handle operated flow control valve unit is indicated generally by the numeral 100. The unit 100 is a well known, widely sold product of Tri-Con, Inc. of Cleveland, Ohio 44132 that typically embodies features of the type that are described in the referenced Flow Control Valve Patents, hence FIGS. 1-3 are appropriately labeled as presenting "Prior Art." Because both the preferred practice of the present invention and the best mode known for carrying out the preferred practice utilize features of the handle-operated flow control valve unit 100, the construction and operation of the unit 100 will be described briefly before describing how the unit 100 preferably is modified in accordance with the preferred practice of the present invention.

Referring to FIG. 1, the unit 100 has a generally L-shaped die cast metal body 110 that defines an inlet leg 112 and an outlet leg 114. Referring to FIGS. 2 and 3, an inlet passage 122 is formed through the inlet leg 112, and an outlet passage 124 is formed through the outlet leg 114. A first valve opening 200 is defined at the juncture of the inlet and outlet passages 122, 124. An internally threaded inlet opening 132 is defined by an enlarged diameter distal end region 116 of the inlet leg 112. An externally threaded distal end region 118 of the outlet leg 114 defines an outlet opening 134 of the body 110.

An operating handle 150 is pivotally mounted on the body 110 for movement between a normal, "non-operated" position that is depicted in FIGS. 1 and 2, and an "operated" position that is shown in FIG. 3. The handle 150 is formed as a stamping from sheet metal, has a yoke-shaped upper end region 152 that is pivotally connected to the body 110 by a first wire-form clip 160, and a gently curved lower end region 154 that, together with portions of the inlet leg 112, can be comfortably grasped in one's hand for operating the handle 150. A second wire-form clip 162 is pivotally connected to the inlet leg 112 at a location adjacent the enlarged diameter end region 116. When desired, the second wire-form clip 162 can be pivoted to the position that is depicted in FIG. 3 wherein the clip 162 embraces the lower end region 154 of the handle 150 to hold the handle in an operated position.

A reversible discharge nozzle 170 has a hollow, hex-shaped nozzle body 172 that is threaded onto the threaded end region 118 of the outlet leg 114. Opposite end regions 174, 176 of the hollow body 172 are internally threaded to permit either of the end regions 174, 176 to be threaded onto the threaded end region 118 of the body 110. A curved screen 178 is carried by the hollow body 172 between the internally threaded end regions 174, 176. The curved screen 178 is positioned to extend across the path of fluid that discharges through the outlet opening 134 of the body 110. A resilient annular seal 180 is clamped between the threaded end region 118 and peripherally extending portions of the curved screen 178 for ducting fluid in a leak-free manner from the outlet opening 134 to the curved screen 178 for discharge therethrough.

When the end region 174 of the nozzle body 172 is threaded onto the outlet end region 118 of the body 110 (as is depicted in FIGS. 1 and 2), the curved screen 178 presents a concave surface to fluid that engages the curved screen 178 after passing through the outlet opening 134 which causes the discharging flow to issue from the nozzle 170 in a gentle, relatively widely spread spray pattern. When the end region 176 is threaded onto the outlet end region 118 of the body 110 (as is depicted in FIG. 3), the curved screen 178 presents a convex surface to fluid that engages the curved screen 178 after passing through the outlet opening 134 which causes the discharging flow to issue from the nozzle 170 in the form of a single forceful stream.

A first valve member 210 is mounted by the body 110 for movement in concert with and in response to operation of the handle 150. Referring to FIG. 2, when the handle 150 is in its normal, non-operated position, the first valve member 210 is biased by a first valve spring 230 toward a "closed" position wherein an O-ring 220 that is carried by the first valve member 210 for sealing the first valve opening 200. Referring to FIG. 3, when the handle 150 is pivoted to its operated position, the first valve member 210 is moved in opposition to the action of the first valve spring 230 to an "open" position wherein the O-ring 220 is withdrawn from the vicinity of the first valve opening 200 to permit fluid flow about a forward stem portion 212 of the first valve member 210 and through the first valve opening 200 from the inlet passage 122 to the outlet passage 124 for discharge through the nozzle 170.

The forward stem portion 212 of the first valve member 210 extends through a hole 190 that is formed in the body 110, through an O-ring 192, through an externally threaded sleeve 194, and has a forward end region 214 that engages the handle 150. The externally threaded sleeve 194 is threaded into an internally threaded hole 196 formed in the body 110 to compress the O-ring 192 between the sleeve 194 and a shoulder 198 through which the hole 190 is formed. The extent to which the O-ring 192 is compressed does not prevent axial movement of the forward stem portion 212 of the first valve member 210 through the hole 190; rather, the O-ring 192 is compressed only to the extent needed to permit the O-ring 192 to serve as a seal that prevents leakage about the forward stem portion 212.

Because the forward end region 214 of the first valve member 210 engages the handle 150, the biasing action that is provided by the first valve spring 230 serves not only to bias the first valve member 210 toward its closed position (depicted in FIG. 2) but also to bias the handle 150 toward its normal "non-operated" position (also depicted in FIG. 2). Likewise, because the forward end region 214 of the first valve member 210 engages the handle 150, when the handle 150 is pivoted toward the inlet leg 112 of the body 110 (typically by grasping the handle 150 and the inlet leg 112 in one's hand so that the handle 150 can be "squeezed" toward the inlet leg 112 in an easy-to-operate manner), the first valve member 210 is moved axially in opposition to the biasing action of the first valve spring 230 to move the O-ring 220 progressively farther away from the first valve opening 200 to permit a progressively increasing flow of fluid to pass from the inlet passage 122 through the first valve opening 200 into the outlet passage 124 for discharge through the nozzle 170.

In the prior art embodiment 100 that is depicted in FIGS. 1-3, a plug 240 has an externally threaded surface 242 that is threaded into an internally threaded assembly opening 168 of the body 110. The plug 240 has a forwardly-facing recess 244 that is closed by a wall surface 246. An end region 232 of the first valve spring 230 is received within the recess 244 and abuttingly engages the wall surface 246. An opposite end region 234 of the first valve spring 230 engages an enlarged diameter formation 216 of the first valve member 210 for biasing the first valve member 210 away from an open position (depicted in FIG. 3) toward its "closed" position (depicted in FIG. 2), and for biasing the handle 150 away from an "operated" position (depicted in FIG. 3) toward its normal, "non-operated" position (depicted in FIG. 2).

In the embodiments 100', 100" that are depicted in FIGS. 4-7 and 8-13, respectively, the plug 240 is replaced by a sleeve 250 that has a threaded forward end region 252 that is threaded into the internally threaded assembly opening 168 of the body 110. The sleeve 250 has a centrally extending passage 254 extending therethrough which is diminished in diameter at a location where a radially inwardly extending shoulder 266 defines a second valve opening 300. The end region 232 of the first valve spring 230 extends into the forward end region 262 of the passage 254 and abuttingly engages a shoulder 266, by which arrangement the first valve spring 230 is positioned and functions in the embodiments 100', 100" in substantially the same way as the first valve spring 230 is positioned and functions in the embodiment 100. Thus, the embodiments 100', 100" differ from the embodiment 100 in a first way in that the embodiments 100', 100" replace the plug 240 of the embodiment 100 with the sleeve 250.

A second way in which the embodiments 100', 100" differ from the embodiment 100 has to do with the configuration of the right end region of the first valve member 210. Whereas the first valve member 210 that is employed by the prior art embodiment 100 has a flat rear end surface 218, the first valve members 210 that are employed by the embodiments 100', 100" have relatively shallow, rearwardly-facing holes 226 formed in their rear end surfaces 218. The holes 226 are closed at their forward ends by wall surfaces 228.

Figure 5:
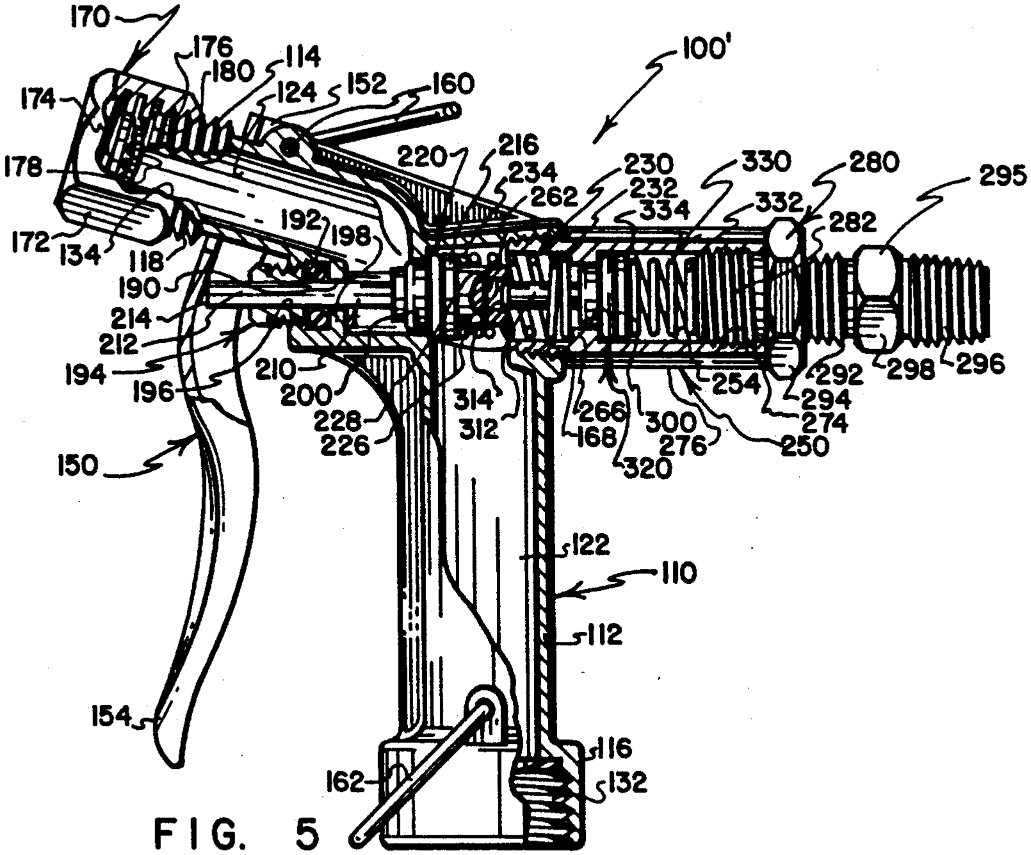
FIG. 5 is a side elevational view of the handle operated flow control valve unit of FIG. 4, but with portions of the valve unit broken away and shown in cross-section, with the operating handle in its normal "non-operated" position.
Figure 6:
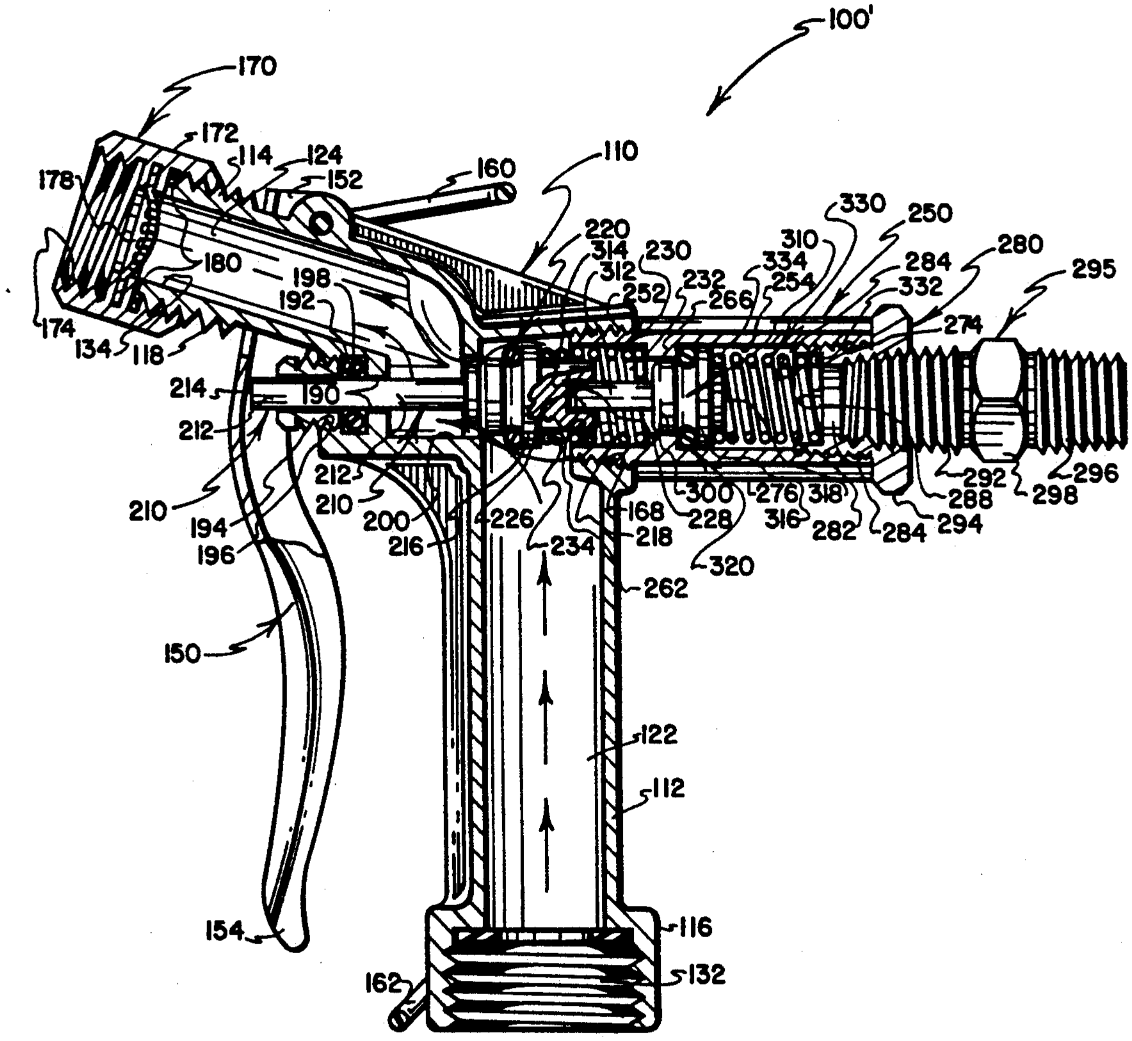
FIG. 6 is a side elevational view of the handle operated flow control valve unit of FIGS. 4 and 5, with portions of the valve unit broken away and shown in cross-section, and with the operating handle moved to an "operated" position that is within a first range of movement wherein a flow of a first fluid such as pressurized water is established through the body of the valve unit as is depicted by arrows.
Figure 7:
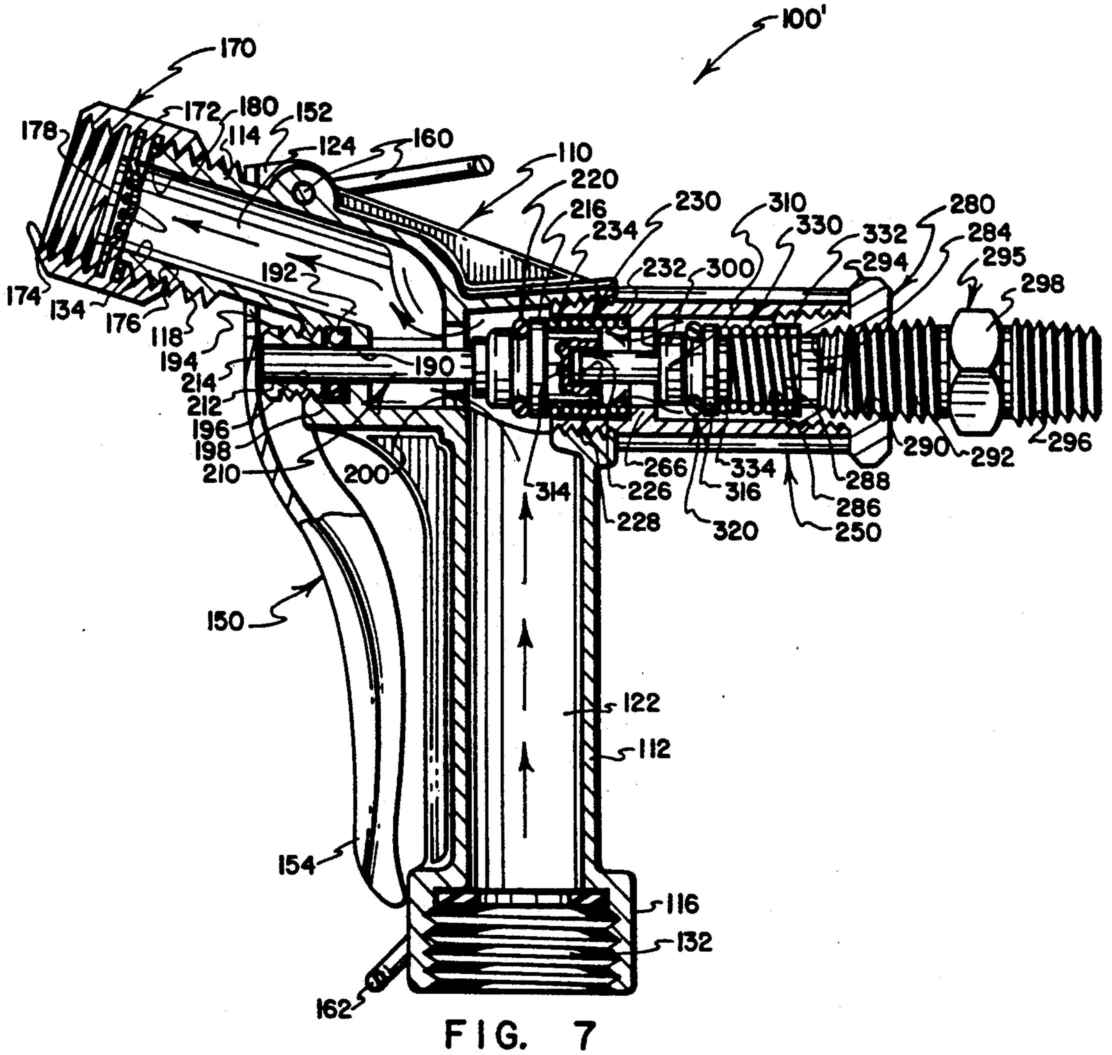
FIG. 7 is a side elevational view of the handle operated flow control valve unit of FIGS. 4-6, with portions of the valve unit broken away and shown in cross-section, and with the operating handle moved to an "operated" position that is within a second range of movement wherein flows of two fluids such as pressurized water and pressurized air are combined within the body for discharge, as is depicted by arrows.
Figure 9:
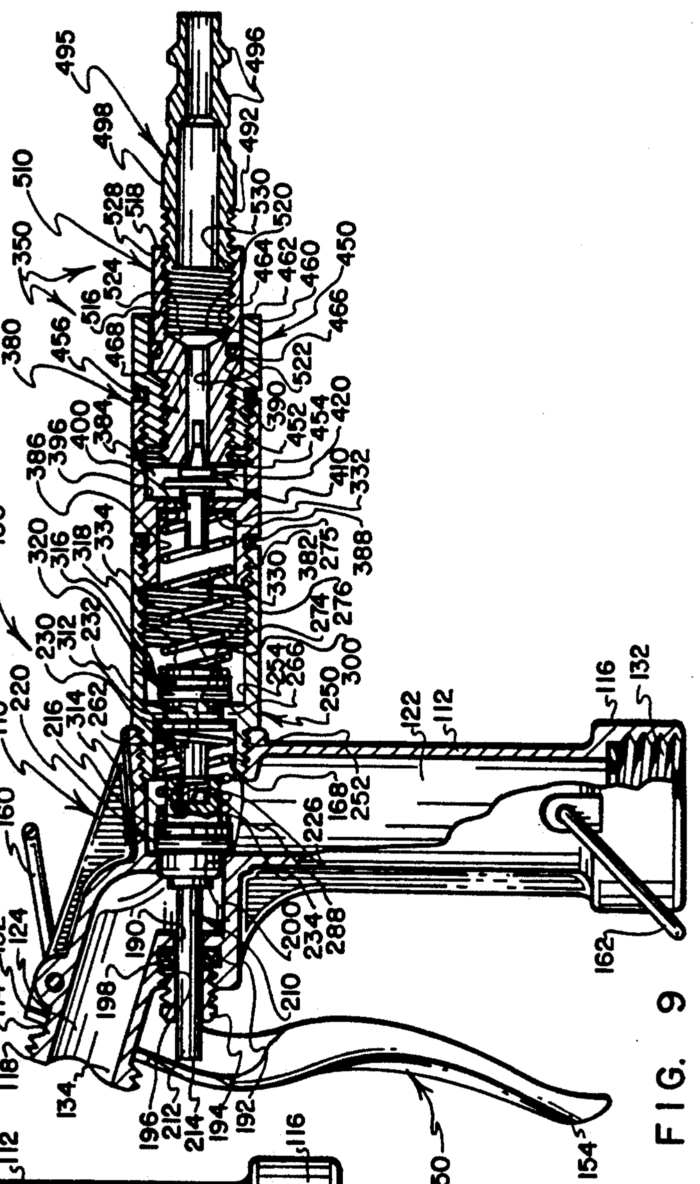
FIG. 9 is a side elevational view of the handle operated flow control valve unit of FIG. 8, with a discharge end region broken away, with portions of the valve unit broken away and shown in cross-section, and with the operating handle in its "non-operated" position.
Figure 8:
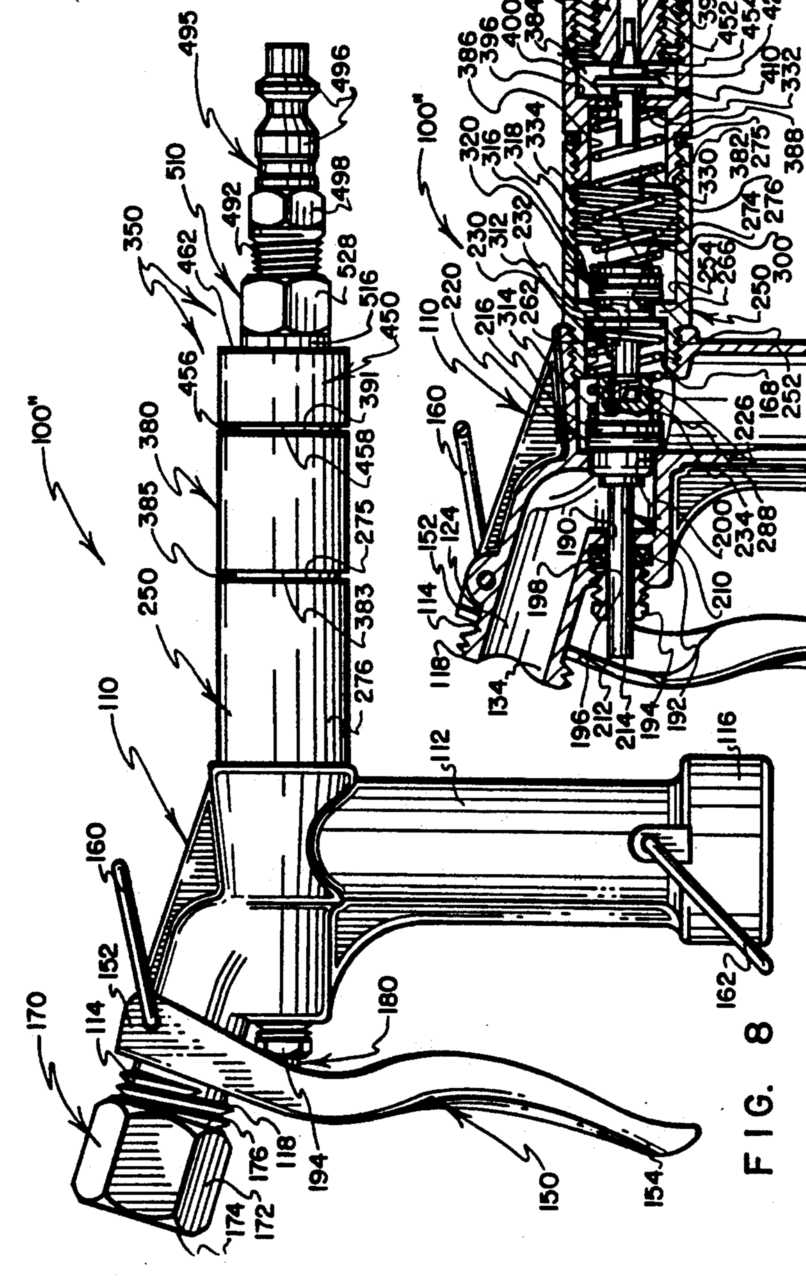
FIG. 8 is a side elevational view of an alternate form of handle operated flow control valve that embodies the preferred practice of the present invention, with the view depicting the operating handle of the valve in its normal, "non-operated" position.
Figures 10, 13:
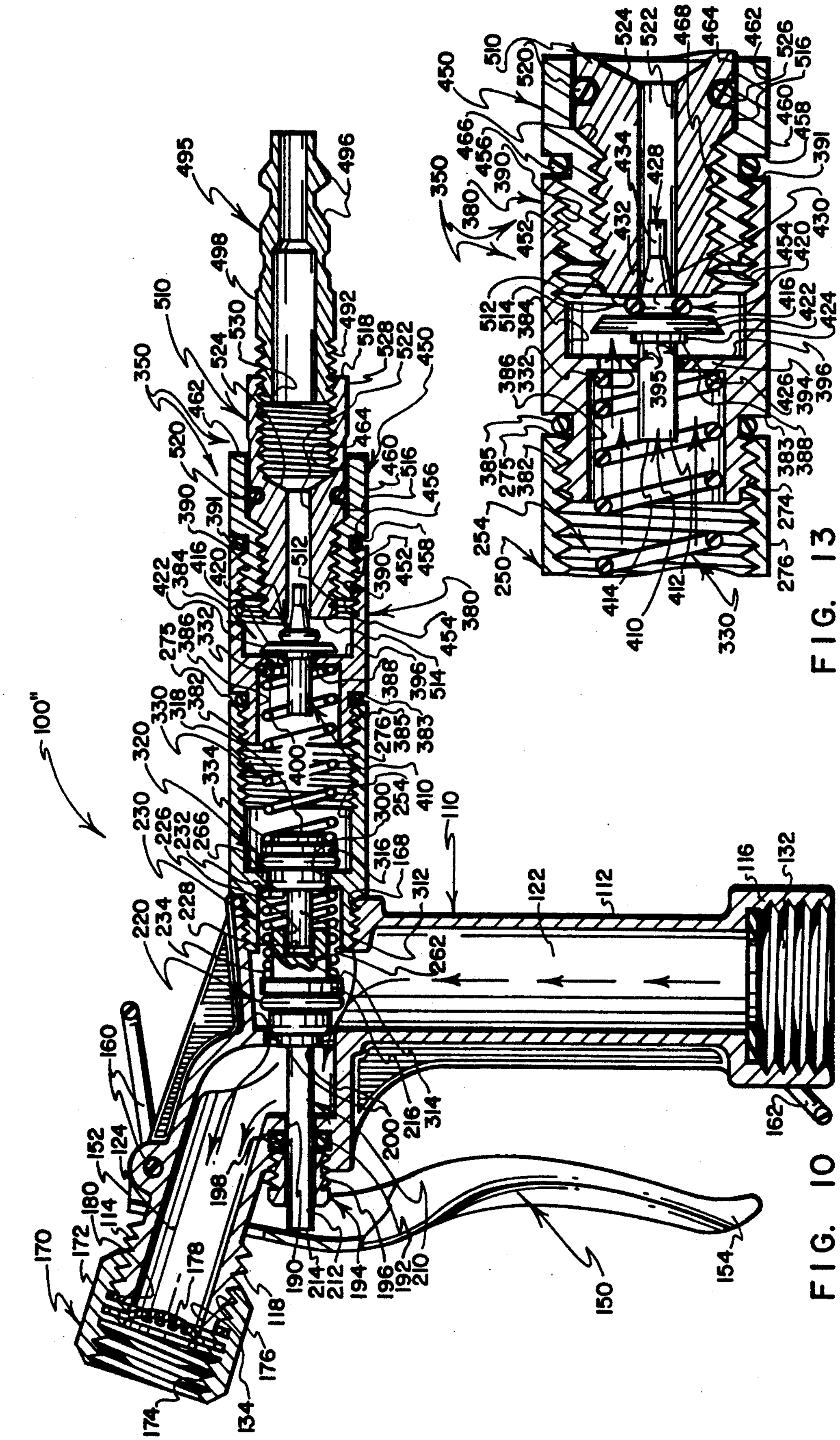
FIG. 10 is a side elevational view of the handle operated flow control valve unit of FIGS. 8 and 9, with portions of the valve unit broken away and shown in cross-section, and with the operating handle moved to an "operated" position that is within a first range of movement wherein a flow of a first fluid such as pressurized water is established through the body of the valve unit as is depicted by arrows.
FIG. 13 is a side elevational view similar to FIG. 12 but showing components of the combined check valve and second-fluid flow regulator functioning in a back-flow prevention capacity to prevent a first fluid such as pressurized water from being admitted to a supply line through which a second fluid such as pressurized air is delivered to the valve unit; and, FIG. 14 is a partially exploded perspective view showing components that are used in forming both the handle operated flow control valve unit of FIGS. 4-7 and the unit of FIGS. 8-12, and with portions of selected ones of the components broken away to permit the viewing of internal features.
Figures 11, 12:
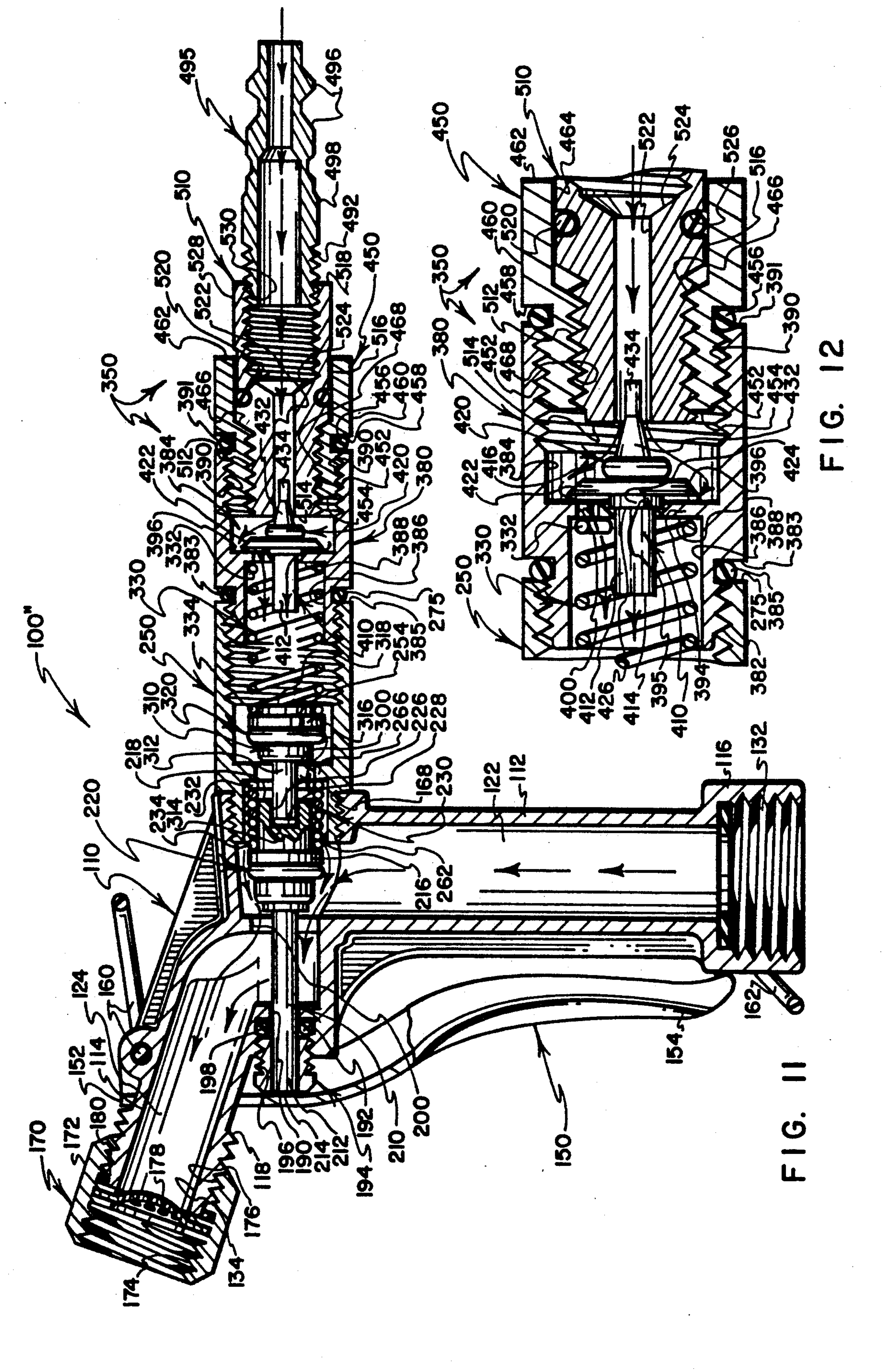
FIG. 11 is a side elevational view of the handle operated flow control valve unit of FIGS. 8-10, with portions of the valve unit broken away and shown in cross-section, with the operating handle moved to an "operated" position that is within a second range of movement wherein flows of two fluids such as pressurized water and pressurized air are combined within the body for discharge, as is depicted by arrows, and with components of a combined check valve and second-fluid flow regulator being set to provide a relatively minimal flow of a second fluid such as pressurized air.
FIG. 12 is a side elevational view, on an enlarged scale, of portions of the valve unit of FIGURES 8-11, with portions broken away and shown in cross-section, and with components of the combined check valve and second-fluid flow regulator being set to provide a relatively more substantial flow of a second fluid such as pressurized air.

Referring either to FIGS. 5-7 (which relate to the valve embodiment 100'), or to FIGS. 9-11 (which relate to the valve embodiment 100"), the hole 226 that opens through the rear surface 218 of the first valve member 210 serves two purposes that have to do with the manner in which the hole 226 receives and interacts with a forward stem end region 312 and an end surface 314 of a second valve member 310. Because the two purposes that are served by the hole 226 that is formed in the first valve member 210 are important in providing a desired type of interaction between the first valve member 210 and the second valve member 310, these two purposes or "functions" will be described shortly, in detail.

As a preface to a discussion of the type of interaction that takes place between the hole 226 and its end surface 228, and the stem 312 and its end surface 314, it is appropriate to note that the second valve member 310 carries an O-ring 320 that is positioned relative to a second valve opening 300 by axially moving the second valve member 310. Just as the first valve member 210 is movable axially to position its O-ring 220 to selectively establish and regulate flow through the first valve opening 200, the second valve member 310 is movable axially to position its O-ring 320 to selectively establish and regulate flow through the second valve opening 300. Just as a first valve spring 230 is provided to engage an enlarged diameter portion 216 of the first valve member 210 to bias the first valve member 210 toward a "closed" position wherein its O-ring 220 seals off fluid flow through the first valve opening 200, a second valve spring 330 is provided to engage an enlarged diameter portion 316 of the second valve member 310 to bias the second valve member 310 toward a "closed" position wherein its O-ring 310 seals off fluid flow through the second valve opening 300.

A "closed" position of the second valve member 310 (wherein the O-ring 320 closes off flow through the second valve opening 300) is depicted in FIGS. 5 and 6 (which relate to the embodiment 100'), and in FIGS. 9 and 10 (which relate to the embodiment 100"). An "open" position of the second valve member 310 (wherein the O-ring 320 is moved away from the second valve opening 300 to permit fluid flow through the second valve opening 300) is depicted in FIG. 7 (which relates to the embodiment 100') and in FIG. 11 (which relates to the embodiment 100").

For the second valve member 310 to be moved out of its "closed" position (i.e., for the second valve member 310 to "open" the second valve opening 300 to permit fluid flow therethrough), the handle 150 is pivoted toward the inlet leg 112 of the body 110 (as is depicted in FIG. 7 for the embodiment 100', and in FIG. 11 for the embodiment 100") to cause the first valve member 210 to be moved sufficiently axially away from its "closed" position (in opposition to the action of the first valve spring 230) 1) to permit fluid flow through the first valve opening 200, 2) to bring the end wall 228 of the hole 226 into abutting engagement with the end wall 314 of the stem 312 of the second valve member 310, and 3) to move the second valve member 310 to a sufficient degree away from its "closed" position (in opposition to the action of the second valve spring 330) to permit fluid flow through the second valve opening 300.

A first purpose that is served by the interaction of the hole 226 with the valve stem 312 is to receive and guide the forward end region of the stem 312 of the second valve member 310, to assist in maintaining coaxial alignment of the first and second valve members 210, 310 even during axial movements of one or both of the first and second valve members 210, 310. To carry out this purpose, 1) the diameter of the hole 226 is sized to receive the forward end region of the stem 312 in a slip fit that permits the first and second valve members 210, 310 to move smoothly relative to each other through a short range of relative movement while a forward end surface 314 of the stem 312 is retained within the confines of the hole 226; and, 2) the depth of the hole 226 (i.e., the distance from the end surface 228 of the hole 226 to the end surface 218 of the valve member 210) is sufficient to assure that, even during permitted relative axial movements of the first and second valve members 210, 310, the end surface 314 of the stem 312 remains within the confines of the hole 226.

A second purpose served by the hole 226 in interacting with the valve stem 312 is to provide what is known to those who are skilled in the art as a "lost motion connection" between the first and second valve members 210, 310. In applying the term "lost motion connection" to the type of driving connection that is formed between the first and second valve members 210, 310 in each of the valve embodiments 100', 100", what is meant is that a driving type of connection is provided that eventually will cause the valve members 210, 310 to move axially, in unison, but only after the first valve member 210 has moved axially (independently of the second valve member 310) through a first range of movement that in no way causes corresponding movement of the second valve member 310.

The extent of the range of independent movement (i.e., "lost motion" movement) of the first valve member 210 that is permitted to take place before additional movement of the first valve member 210 will cause corresponding movement of the second valve member 310 is determined by the axially measured length of the space that is present between the end surface 228 of the hole 226 and the end surface 314 of the stem 312 when both of the first and second valve members 210, 310 are in their "closed" positions (see FIG. 5 relating to the embodiment 100', and FIG. 9 relating to the embodiment 100"). Typically, such space is about three millimeters (about ⅛ inch) in length, which is adequate to define an initial range of independent movement of the first valve member 210 that will permit one's utilizing the valve embodiments 100', 100" merely to duct a controlled flow of a first fluid from the inlet opening 132 of the body 110 through the inlet passage 122, through the first valve opening 200, through the outlet passage 124, and through the outlet opening 134 for discharge through the nozzle 170.

When the first valve member 210 has moved axially through its full permitted range of independent movement, the end wall 228 of the hole 226 is brought into abutting engagement with the end surface 314 of the stem 312—whereby further axial movement of the first valve member 210 (in response to the application of additional force applied to the handle 150 to pivot the handle toward the inlet leg 112 of the body 110) will cause corresponding movement, in unison, of the second valve member 310. As the second valve member 310 is moved axially to permit its O-ring 320 to "open" the second valve opening 300, flow of a second fluid such as pressurized air is permitted through the second valve opening 300 for combining with the established flow of a first fluid that is being ducted through the first valve opening 200. The combination of the first and second flows takes place in the general vicinity of the rear end region 218 of the first valve member 210, and the combined flow of fluids then passes through the first valve opening 200 for discharge through the nozzle 170.

Because the first valve member 210 is biased toward its "closed" position by the action of a first valve spring 210, when the first valve member 210 is moved within its "independent" range of movement (wherein its movement is "lost" to the second valve member 310 rather than being transmitted to the second valve member 310 to cause corresponding movement of the second valve member 310), such movement of the first valve member 210 is opposed only by the biasing action of the first valve spring 230. However, once the first valve member 210 has moved axially through its full range of independent movement (to bring the end surface 228 into abutting engagement with the end surface 314 so that the first and second valve members 210, 310 are drivingly engaged), continued axial movement of the first valve member 210 will be accompanied by movement, in unison, of the second valve member 310—which brings into play the biasing action of the second valve spring 330.

As the first and second valve members 210, 310 move in unison away from their respective closed positions, both of the first and second valve springs 230, 330 are compressed—which is to say that the combined biasing action of both of the first and second valve springs 230, 330 must be overcome in order for the first and second valve members 210, 310 to be moved in unison away from their closed positions. The "single spring opposition" to initial squeezing of the handle 150 to move the first valve member 210 within its independent range of movement, followed by the "dual spring opposition" to eventual squeezing of the handle 150 to move the first and second valve members 210, 310 in unison is quite useful in providing a very noticeable "feedback" to one who is applying force to the handle 150. The relatively gentle amount of force that needs to be applied to the handle 150 to move the first valve member 210 in opposition to only the first valve spring 230 while the first valve member 210 is being moved within its "independent" range of movement is sufficiently distinct from the more forceful application of force to the handle 150 that is needed to move both of the valve members 210, 310 in opposition to the biasing action of both of the springs 230, 330 to let the operator know whether only a single fluid is being discharged through the nozzle 170, or whether a combined flow of two fluids is being discharged through the nozzle 170.

In view of the foregoing description, it will be understood that all three of the embodiments 100, 100', 100" share one operational characteristic, namely that, depending on the extent to which the handle 150 is pivoted out of its normal non-operated position, an increasingly greater flow of first fluid from the inlet passage 122 is permitted to pass through the first valve opening 200 into the outlet passage 124. In the prior art embodiment 100, movement of the first valve member 210 by the handle 150 in opposition to the biasing action of the first valve spring 230 serves merely to establish and adjust a rate of flow of a single fluid such as pressurized water from the inlet passage 122 to the outlet passage 124. However, in the embodiments 100', 100", movement of the first valve member 210 by the handle 150 in gentle opposition to the biasing action of the first valve spring 230 causes the first valve member 210 to move within a first range of movement wherein the end surface 314 of the associated second valve member 310 is not engaged by the end surface 228 (whereby only the aforedescribed controlled flow of a single fluid from the inlet passage 122 to the outlet passage 124 is provided); and, if the handle 150 is moved more forcefully so as to oppose not only the biasing action of the first valve spring 230 but also the biasing action of the second valve spring 330 that acts on the second valve member 310, the second valve member 310 opens the second valve opening 300 to permit the passage through the second valve opening 300 of a flow of second fluid for being combined within the inlet passage 122 with the flow of first fluid that for establishing a combined flow that passes through the first valve opening 200 into the outlet passage 124 for discharge through the nozzle 170.

Returning now to a description of features of the sleeve 250 that houses the second valve member 310 and the second valve spring 330, a rear end region 274 of the passage 254 is internally threaded. The sleeve 250 has a cylindrical outer surface 276 that extends along its full length except where, near its front end, threads 278 are provided that are received within the internally threaded opening 168 of the body 110.

Received within the threaded rear end region 274 of the sleeve 250 is a member that engages the rear end 332 of the second valve spring 330. Referring to FIGS. 5-7, in the valve embodiment 100', a member 280 has an externally threaded front end region 282 that is threaded into the threaded rear end region 274 of the sleeve 250. Referring to FIGS. 9-11, a member 380 has an externally threaded front end region 382 that is threaded into the threaded rear end region 274 of the sleeve 250.

Referring to FIGS. 6 and 7, the member 280 has a passage 284 formed therethrough, with a front end portion 286 of the passage 284 being of sufficiently large diameter to permit the rear end region 332 of the second valve spring 330 to enter to a point where the rear end region 332 engages a shoulder 288. The rear end region of the passage 284 is provided with internal threads 290 for receiving a threaded end region 292 of a suitable supply line connector 295, and with a hex-shaped outer surface formation 294 that assists in tightening the member 280 into leak-free engagement with the threaded rear end region 284 of the sleeve 250.

The character of the supply line connector 295 that is provided to connect the member 280 to a source of pressurized fluid such as a pressurized air hose (not shown) is not of consequence to the present invention. Thus, the supply line connector 295 that is depicted in FIGS. 4-8 is a conventional, commercially available nipple that has externally threaded end regions which are separated by a hex-shaped outer surface formation 296.

Figure 14:
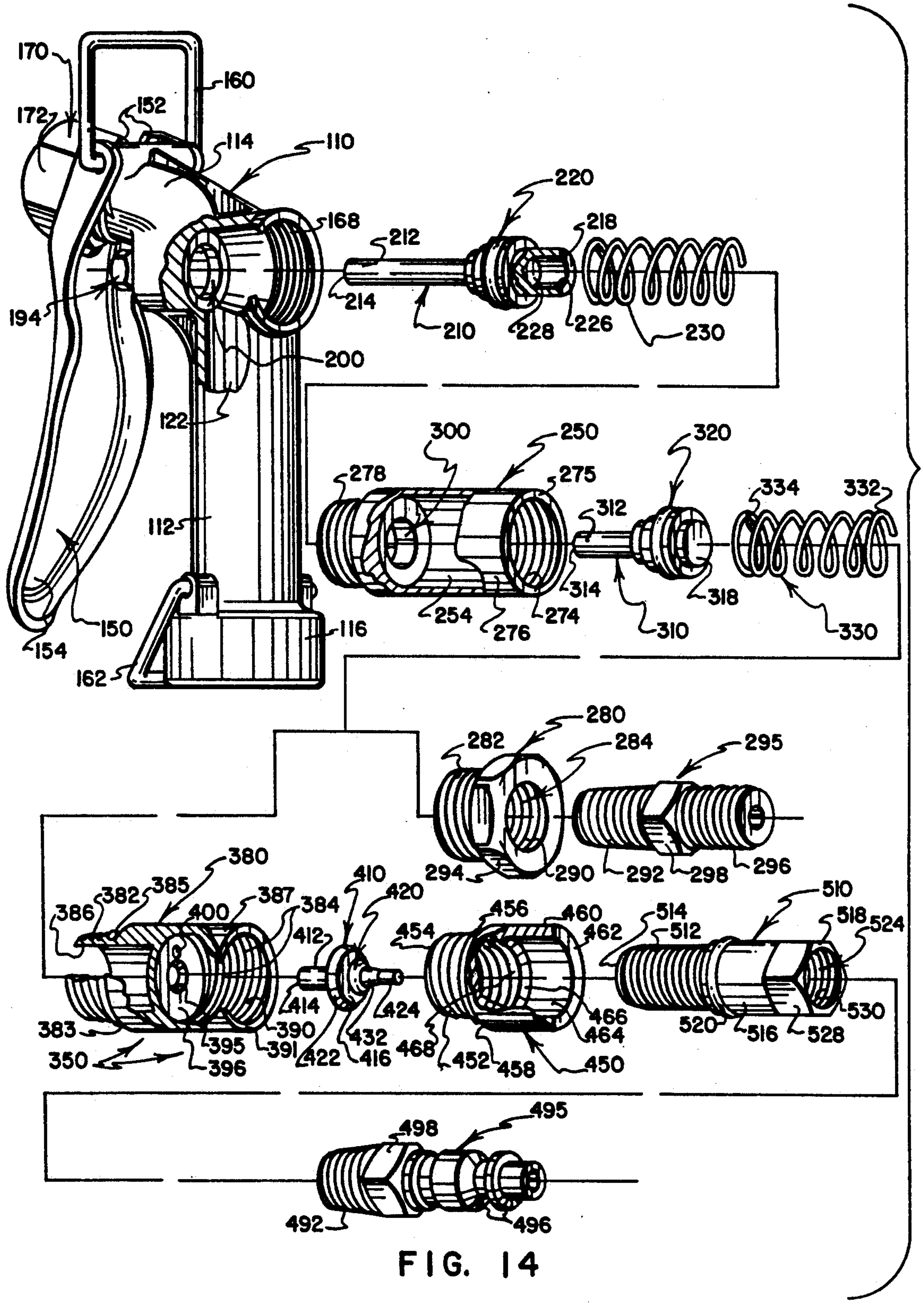

Referring briefly to FIG. 14, the components that have been described above as being employed by the valve embodiments 100', 100" are depicted, with several of these components being broken away to permit inner features to be viewed. While several of the components that are used in the prior art embodiment 100 are shown "assembled," components that are unique to the valve embodiments 100', 100" are depicted as extending from the threaded opening 168 of the body 110 in the order in which they are assembled to form either the valve embodiment 100' or the valve embodiment 100". If the member 280 and the supply line connector 295 are threaded together, and if the member 280 is threaded into the sleeve 250, the depicted components form the valve embodiment 100'. If the member 380 is threaded into the sleeve 250 (and if other associated components that are depicted toward the bottom of FIGURE 14 are connected to the member 380 in a manner that will be described shortly), the depicted components form the valve embodiment 100".

Inasmuch as the description of the embodiment 100' is now complete, it will be understood that what the valve embodiment 100' provides is a dual-in-line arrangement of valve members 210, 310 that are drivingly interconnected by a "lost motion connection" that 1) permits the first valve member 210 to operate initially within a range of independent movement to provide a controlled flow of a first fluid such as pressurized water from the inlet passage 122 through the first valve opening 200 and into the outlet passage 124 for discharge through the nozzle 170, and 2) permits the first and second valve members 210, 310 to move in unison (once the first valve member 210 has moved fully through its independent range of movement) to provide a controlled flow of a second fluid such as pressurized air from the supply line connector 295 through the member 280, through the second valve opening 300 that is defined by the sleeve 250 and into the upper end region of the inlet passage 122 for mixing with the first fluid flow and for discharge as a combined flow through the first valve opening 200, through the outlet passage 124 and through the discharge nozzle 170.

While the interaction of the second valve member 310 with the second valve opening 300 in the embodiment 100' is adequate in some applications to sufficiently regulate a flow of pressurized air through the opening 300 for combination with a flow of pressurized water that is supplied through the inlet opening 132 of the body 110, in many applications it is desired to provide a more precise control of the flow rate at which pressurized air is permitted to flow through the second valve opening 300 for combination with a flow of pressurized water that is supplied through the inlet opening 132. Moreover, in some applications, it also is important to provide a backflow prevention capability that assures that pressurized water from the inlet passage 122 will not (in the event of a failure of a pressurized air supply) escape through the second valve opening 300 and backflow into a pressurized air supply line (not shown) that is connected to a supply line connector such as the nipple 295 that is depicted in FIGS. 4-7. While the valve embodiment 100' does not address these needs, the preferred valve embodiment 100" does—by providing (in addition to the features of the embodiment 100') a combination flow control and backflow prevention valve that is indicated generally by the numeral 350 in FIGS. 8-14.

Referring to FIGS. 9-11 and 14, the member 380 has a forward end region 382 that is threaded and that carries an O-ring seal 385 at a location where a radially outwardly extending shoulder formation 383 forms a transition between the threaded forward end region 382 and a generally cylindrical outer surface 387 of the member 380. When the member 380 has its threaded forward end region 382 properly tightened into threaded engagement with the threaded rear end region 274 of the sleeve 250, the O-ring 385 is compressed between an annular rear end surface 275 of the sleeve 250 and the shoulder 383 of the member 380 to prevent fluid leakage therebetween.

The member 380 has a passage 384 formed therethrough, with a front end portion 386 of the passage 384 being of sufficiently large diameter to permit the rear end region 332 of the second valve spring 330 to enter to a point where the rear end region 332 engages a shoulder 388 The rear end region of the passage 384 is provided with internal threads 390 for receiving a threaded forward end region 452 of a sleeve 450.

The forward end region 452 of the sleeve 450 defines a forward end surface 454. An O-ring seal 456 is carried by the sleeve 450 at a location where a radially outwardly extending shoulder formation 458 forms a transition between the threaded forward end region 452 and a generally cylindrical outer surface 460 of the sleeve 450. At the rear end of the outer surface 460, an annular, radially extending surface 462 is defined. Joining the end surface 462 and extending interiorly therefrom is a smoothly finished, generally cylindrical inner surface 464 At the front end of the inner surface 464, a tapered wall 466 provides a transition to an interiorly threaded passage 468 that opens through the forward end surface 454.

When the sleeve 450 has its threaded forward end region 452 properly tightened into threaded engagement with the threaded rear end region 390 of the member 380, the O-ring 456 is compressed between an annular rear end surface 391 of the member 380 and the shoulder 458 of the sleeve 450 to prevent fluid leakage therebetween. When the sleeve 450 is properly tightened in place, the forward end surface 454 of the sleeve 450 is spaced a substantial distance from an annular wall surface 396 that is defined within the interior of the member 380.

Referring to FIGS. 12 and 13, the interior of the member 380 includes a radially inwardly projecting wall 394 that is relatively thin. The shoulder 388 that engages the rear end region 332 of the second valve spring 330 is defined by the forward side of the wall 394. The annular surface 396 that is spaced from the forward end surface 454 of the sleeve 450 is defined by the rearward side of the wall 394. Extending centrally through the wall 394 is a tapered opening 395 that considerably narrows the passage 384, especially within the vicinity of where the passage 384 opens through the shoulder 388. Also formed through the wall 394 is a passage 400 that is offset to one side of the central opening 395. As will be explained in greater detail shortly, the passage 400 is always held open to permit the passage of fluid through the wall 394—even if the central opening 395 is closed by portions of a third valve member 410.

Referring to FIGS. 12-14, the third valve member 410 has an enlarged diameter central region 416 with a tapered peripheral surface 422. Extending forwardly from the central region 416, as is best seen in FIGS. 12 and 13, is a generally cylindrical spacer formation 424 that defines a radially extending shoulder 426. The shoulder 426 provides a transition between the generally cylindrical outer surface of the spacer formation 424 and a generally cylindrical forwardly extending stem 412. The front stem 412 extends relatively loosely through the central opening 395 and defines a forward end surface 414. The front stem 412 always extends through the central opening 395 even though the third valve member 410 is movable axially through a limited range of movement with respect to the wall 394 through which the opening 395 is formed.

Extending rearwardly from the central region 416, as is best seen in FIG. 13, is a relatively complexly configured rear stem 428. Adjacent the central region 416, the stem 428 defines a groove 430 for receiving and retaining an O-ring 420. Extending rearwardly from the location of the groove 430 is a frusto-conically tapered region 432. Extending rearwardly from the tapered region 432 is a rear end region 434 that is of relatively small but uniform diameter. Before explaining the manner in which the third valve member 410 functions, it is necessary to describe a fourth valve member 510 that cooperates with the third valve member 410 1) to perform backflow prevention (of a first fluid from passing by the O-ring seal 420 and entering a passage 522 that is formed in the fourth valve member 410 and eventually entering a supply line connector 495 that is connected to the fourth valve member 510—which might otherwise tend to happen in the event of a failure of a supply of pressurized second fluid to the supply line connector 495) and 2) to regulate forward flow (of a second fluid from the supply line connector 495 and through the passage 522 for eventually being ducted through the second valve opening 300 when the second valve member 310 is opened by operating the handle 150).

Referring to FIGS. 9-11 and 14, the fourth valve member 510 has a threaded forward end region 512 that is terminated by a flat end surface 514 through which a relatively small diameter forward end region 522 of a central passage 524 opens. The fourth valve member 510 has a central region 516 that is of relatively uniform diameter except where a circumferentially extending groove 526 (see FIGS. 12 and 13) is provided for receiving and retaining an O-ring 520. The fourth valve member 510 has a rearwardly extending hex outer surface formation 528 that is terminated by an end wall 518. The central passage 524 has an internally threaded rear end region 530 that opens through the end wall 518.

The internal threads 468 that are provided in the forward end region of the sleeve 450, and the external threads 512 that are provided on the forward end region of the fourth valve member 510 are formed so that the fourth valve member 510 can be threaded relatively easily, by hand, into and out of the threaded passage 468 of the sleeve 450 to adjustably space the front end surface 514 of the fourth valve member 510 from the annular wall surface 396 of the member 380. By selectively threading the fourth valve member 510 forwardly and rearwardly with respect to the sleeve 450, the extent to which the threaded forward end region 512 of the fourth valve member 510 projects forwardly from the front end surface 454 of the sleeve 450 can be quite precisely adjusted.

By so adjusting the position of the forward end surface 514 of the fourth valve member 510 relative to the annular surface 396 of the member 380, the distance through which the enlarged diameter central region 416 of the third valve member 410 is movable axially between the surfaces 396, 514 is controllable—which has the very desirable effect of nicely regulating the rate of flow of a second fluid such as compressed air from the forward passage portion 522 of the fourth valve member 510 through the space that surrounds the enlarged diameter central region 416 of the third valve member 410 and thence through the offset passage 400 to the vicinity of the second valve opening 300.

The manner in which adjusting the position of the forward end surface 514 causes a desired type of regulation of the flow to take place (i.e., regulation of a flow of a second fluid such as pressurized air that is to be ducted from the passage 522, around the enlarged diameter central region 416 of the third valve member 410 and through the offset passage 400 to the vicinity of the second valve opening 300) principally involves controlling the type of interaction that takes place between the forward end of the passage 522 (that is formed through the forward end region of the fourth valve member 510) and the tapered surface 432 (that is formed on the rear stem 428 of the third valve member 420, which tapered surface extends into the forward end region 522 of the passage 524 to control the effective size of the opening of the passage 524 through the end surface 514 of the fourth valve member 510). Depending on the degree to which the tapered surface 432 is made to extend into the forward end region of the passage 522, the tapered surface 432 will cooperate with the cylindrical wall of the passage 522 to restrict to a varying degree the effective size of the passage opening through which a second fluid such as compressed air must pass in order to gain access to the relatively large open space that is located between the end surfaces 396, 514 (within which space the relatively large diameter central region 416 of the third valve member 410 is free to move axially to perform a backflow prevention function that will be described shortly).

When the second valve opening 300 is open to permit the passage therethrough of such second fluid as compressed air, the force of the entry of second fluid through the confined space between the tapered surface 532 and the surrounding wall of the passage 522 will cause the third valve member 410 to move forwardly to the fullest extent of its permitted range of travel—which causes the spacer formation 424 of the third valve member 410 to engage the tapered wall of the central opening 395 so as to hold the enlarged diameter central region 416 of the third valve member 410 in spaced relationship with the annular wall surface 396. With the third valve member 410 so positioned (i.e., with its spacer formation 424 engaging the tapered wall of the central opening 395), the flow rate at which the second fluid is being ducted through the offset passage 400 to the second valve opening 300 can be decreased by threading the fourth valve member 410 farther into the sleeve 450 to bring the surfaces 396, 514 more closely together, and can be increased by threading the fourth valve member 410 farther out of the sleeve 450 to more widely space the surfaces 396, 514.

If the surfaces 396, 514 are brought so closely together as to effectively prohibit axial movement of the third valve member 410, this will cause the O-ring 420 of the third valve member 410 to seal against the front surface 514 of the fourth valve member 510 to positively prevent any flow of a second fluid such as compressed air to discharge from the passage 522, and to positively prevent any backflow of a first fluid such as pressurized water from entering the passage 522. While such a close positioning of the surfaces 396, 514 is not the normal way in which the valve embodiment 100" is employed, the fact that the surfaces 396, 514 can be so closely positioned as to positively prevent flow of any type through the passage 522 gives the embodiment 100" the capability of serving in essentially the same capacity as the prior art embodiment 100—should it be desired to utilize the embodiment 100" as a simple flow control for discharging a single fluid such as pressurized water through the nozzle 170.

In FIGS. 9 and 10, a typical set of extremes of axial movement of the third valve member 410 are illustrated—with the surfaces 396, 514 depicted as being relatively closely spaced (so as to provide a relatively minimal flow of second fluid through the offset passage 400). In FIG. 12, the surfaces 396, 514 are depicted as being more widely spaced (to permits the frusto-conically tapered region 432 of the third valve member 410 to open the forward passage portion 522 sufficiently to permit a more substantial flow of second fluid to flow past the third valve member 410 and through the offset passage 400).

Because the cylindrical spacer formation 424 functions to ensure that the offset passage 400 is at no time blocked by the enlarged diameter central region 416 of the third valve member 410, it is possible that, under certain unusual circumstances (the most likely being a failure of the supply of pressurized second fluid such as compressed air to be fed to the supply fitting 495), a quantity of the first fluid (from the inlet passage 122) may be caused to pass in a reverse flow direction through the second valve opening 300 and through the offset passage 400 where, if it were not for the presence of the O-ring seal 420 carried on the movable third valve member 410, such backflow fluid might be permitted to enter the passage 522 of the fourth valve member 510, and thence into the supply line connector 495 (and into a connected supply line, not shown). The movable third valve member 410 functions in the capacity of a "check valve" to prevent such backflow in that, as a first fluid such as pressurized water passes through the offset passage 400, its engages the third valve member 410 and moves the third valve member 410 rearwardly to seat the O-ring 420 against the front face 514 of the fourth valve member 510 so that backflow fluid is prevented from flowing into the passage 522.

The character of the supply line connector 495 that is provided to connect the fourth valve member 510 to a source of pressurized fluid such as a pressurized air hose (not shown) is not of consequence to the present invention. Thus, the supply line connector 495 that is depicted in FIGS. 9–11 and 14 is a conventional, commercially available quick disconnect connector nipple that has one externally threaded end region 492, a hex formation 498, and a relatively standard configuration 496 for being received within a mating portion of a conventional, commercially available quick disconnect assembly (not shown). Other types of supply line connectors can, of course, be used to replace the depicted connector 495 if desired.

Inasmuch as the description of the embodiment 100" is now complete, it will be understood that what the valve embodiment 100" provides is a quad-in-line arrangement of valve members 210, 310, 410, 510, with the valve members 210, 310 being drivingly interconnected by a "lost motion connection" that 1) permits the first valve member 210 to operate initially within a range of independent movement to provide a controlled flow of a first fluid such as pressurized water from the inlet passage 122 through the first valve opening 200 and into the outlet passage 124 for discharge through the nozzle 170, and 2) permits the first and second valve members 210, 310 to move in unison (once the first valve member 210 has moved fully through its independent range of movement) to provide a controlled flow of a second fluid such as pressurized air from the supply line connector 495 through the member 280, through the second valve opening 300 that is defined by the sleeve 250 and into the upper end region of the inlet passage 122 for mixing with the first fluid flow and for discharge as a combined flow through the first valve opening 200, through the outlet passage 124 and through the discharge nozzle 170; and with the valve members 410, 510 cooperating in the manner described above to perform both a backflow prevention function and to assist in providing a desired type of regulated flow of second fluid such as pressurized air from the supply line connector 495 through the second valve opening 300 for being mixed with a first fluid within the inlet passage for discharge as a combined flow through the nozzle 170.

Although the aforedescribed handle operated flow control embodiments and components thereof are depicted in the drawings as extending substantially vertically or substantially horizontally, as facing substantially leftwardly or substantially rightwardly, or are described as extending forwardly or as extending rearwardly, it will be understood that such depictions and terms of orientation as are employed herein are not to be taken as limiting the claims that follow, for the depicted and described valve units can be utilized in substantially any desired orientation.

While the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention as hereinafter claimed. It is intended that the patent shall cover, by suitable expression in the claims, such features of patentable novelty as exist in the invention.

What is claimed is:

1. A handle operated flow control valve, comprising:

a) valve body means for defining:

i) a generally L-shaped valve body having an elongate inlet leg and an elongate outlet leg that each have proximal and distal end regions, that are joined near their proximal end regions, and that define an inlet opening near the distal end region of the inlet leg and an outlet opening near the distal end region of the outlet leg;

ii) primary inlet passage means for defining a primary inlet passage that extends through the inlet leg from the proximal end region to the distal end region of the inlet leg, and for communicating with the inlet opening at the distal end region of the inlet leg to receive a supply of a first pressurized fluid that is introduced into the valve body through the inlet opening;

iii) outlet passage outlet passage that extends through the outlet leg from the proximal end region to the distal end region of the outlet leg, and for communicating with the outlet opening at the distal end region of the outlet leg to discharge from the valve body such fluid as is introduced into the valve body;

iv) first valve opening means for defining a first valve opening for communicating the primary inlet passage with the outlet passage at a location near where the proximal end regions of the inlet leg and the outlet leg are joined;

v) first assembly opening means for defining a first assembly opening located near the proximal end region of the primary inlet leg for providing access through the primary inlet passage to the first valve opening for permitting portions of a first valve means to be installed within the valve body at a first location that extends between the first valve opening and the first assembly opening;

b) first valve means having at least portions thereof that are configured to permit their being installed in the valve body by being inserted through the first assembly opening for being positioned at said first location for being movable relative to the valve body between a closed position wherein the first valve means seals the first valve opening to prevent fluid flow from the primary inlet passage to the outlet passage, and open positions wherein the first valve means cooperates with the first valve opening to selectively control fluid flow through the first valve opening from the primary inlet passage to the outlet passage;

c) handle means including a handle that is connected to the valve body and to the first valve means for movement within a permitted range of movement relatively toward and away from the inlet leg of the valve body between a non-operated position wherein the handle means permits the first valve means to move to its closed position to seal the first valve opening to thereby prevent fluid flow therethrough, and operated positions wherein the handle means positions the first valve means in open positions to selectively control fluid flow through the first valve opening from the primary inlet passage to the outlet passage;

d) auxiliary input means connected to the valve body for admitting a controlled flow of a second pressurized fluid through the assembly opening into the primary inlet passage for combining with said first pressurized fluid for being ducted together with the first pressurized fluid through the first valve opening into the outlet passage for discharge through the outlet opening, including:

i) elongate sleeve means A) having first end region means configured to be rigidly connected to the body at the location of the assembly opening for defining a feed passage that communicates through the assembly opening with the primary inlet passage for ducting a flow of a second pressurized fluid into the primary inlet passage, B) having second end region means for defining a second assembly opening and a secondary inlet passage that communicates with the second assembly opening for receiving a supply of a second pressurized fluid, and C) defining a second valve opening for communicating the secondary inlet passage with the feed passage means, D) with the second assembly opening being configured to provide access through the secondary inlet passage to the second valve opening for permitting portions of a second valve means to be installed within the sleeve means at a second location that extends between the second valve opening and the second assembly opening;

ii) second valve means having at least portions thereof that are configured to permit their being installed in the sleeve means by being inserted through the second assembly opening for being positioned at said second location for being movable relative to the sleeve means between a closed position wherein the second valve means seals the second valve opening to prevent fluid flow therethrough, and open positions wherein the second valve means cooperates with the second valve opening to selectively control fluid flow through the second valve opening from the secondary inlet passage to the feed passage;

e) first biasing means connected to the first valve means and to a selected one of the sleeve means and the valve body for biasing the first valve means away from its open positions toward its closed position;

f) second biasing means connected to the second valve means and to a selected one of the sleeve means and the valve body for biasing the second valve means away from its open positions toward its closed position; and, g) lost motion connection means for selectively drivingly connecting the first valve means to the second valve means such that:

i) when the handle is moved away from its non-operated position within an initial part of its permitted range of movement, the first valve means will be caused to move away from its closed position in opposition to the biasing action of the first biasing means to open the first valve opening to permit a controlled flow of first fluid therethrough from the primary inlet passage to the outlet passage, with such movement of the first valve means not causing corresponding movement of the second valve means and not being opposed by the biasing action of the second biasing means; and, ii) when the handle is moved away from its non-operated position beyond said initial part of its permitted range of movement to the remaining part of its permitted range of movement, both the first valve means and the second valve means will be caused to move, in unison, away from their respective closed positions, with such movement of the first valve means being opposed by the biasing action of the first biasing means, and with such movement of the second valve means being opposed by the biasing of the second biasing means.

2. The handle operated flow control valve of claim 1 additionally including check valve means connected to the sleeve means for admitting a flow of pressurized second fluid to the sleeve means through the second assembly opening, and for preventing backflow of fluid from the sleeve means through the check valve means.

3. The handle operated flow control valve of claim 1 additionally including flow regulator valve means connected to the sleeve means for admitting a regulated flow of pressurized second fluid to the sleeve means through the second assembly opening.

4. The handle operated flow control valve of claim 1 additionally including combined flow regulator valve means and check valve means connected to the sleeve means for admitting a regulated flow of pressurized second fluid to the sleeve means through the second assembly opening, and for preventing backflow of fluid from the sleeve means through the check valve means.

5. The handle operated flow control valve of claim 4 wherein:

a) the combined flow regulator valve means and check valve means includes generally cylindrical housing means for being connected to the sleeve means at the location of the second assembly opening and for extending coaxially in alignment with the sleeve means so as to serve substantially as a contiguous extension of the sleeve means;

b) the generally cylindrical housing means is operable to define a chamber through which pressurized second fluid must flow on its way toward being ducted into the sleeve means through the second assembly opening, with the chamber being defined in part by an inlet wall that has an inlet hole formed therein through which pressurized second fluid is permitted to enter the chamber, and being defined in part by an outlet wall that has an outlet hole formed therein through which pressurized second fluid is permitted to exit the chamber on its way toward being ducted into the sleeve means through the second assembly opening, with the inlet wall and the outlet wall extending substantially in spaced parallel relationship so as to define at least portions of opposite end walls of the chamber;

c) third valve means is mounted within said chamber for movement between the inlet wall and the outlet wall for carrying sealing means that is operable to seal about the inlet hole to prevent backflow of fluid from the chamber into the inlet hole in response to fluid having backflowed into the chamber through the outlet opening; and, d) fourth valve means that includes:

i) a valve formation connected to the third valve means for cooperating with the inlet hole to regulate the effective size of the area of the inlet hole through which second pressurized fluid can enter the chamber, with such regulation being dependent on the extent to which portions of the third valve member are moved away from the inlet wall; and, ii) means for selectively controlling the spacing between the inlet wall and the outlet wall for controlling the extent to which the third valve member can move away from the inlet wall, and to thereby selectively regulate the flow of second pressurized fluid into the chamber through the inlet hole.

6. The handle operated flow control valve of claim 5 wherein the third valve means includes a third valve member that has an enlarged diameter portion that is movable toward and away from the inlet wall and the outlet wall, with the enlarged diameter portion being supported at least in part by a tapered stem projection that extends from one end of the enlarged diameter portion so as to project into the inlet hole to provide said valve formation that cooperates with the inlet hole to regulate the effective size of the area of the inlet hole through which second pressurized fluid can enter the chamber.

7. The handle operated flow control valve of claims 5 or 6 wherein the means for selectively controlling the spacing between the inlet wall and the outlet wall for controlling the extent to which the third valve member can move away from the inlet wall includes:

a) an internally threaded formation defined by the generally cylindrical housing means; and, b) an externally threaded member that is threadable, by hand, into the internally threaded formation, that defines the inlet wall and the inlet hole that opens through the inlet wall, and that is operable to selectively control the spacing between the inlet wall and the outlet wall by adjusting, by hand, the extent to which the externally threaded member is threaded into the internally threaded formation.

8. The handle operated flow control valve of claims 2, 3, 4, 5 or 6 wherein the first valve means includes an elongate first valve member, the second valve means includes an elongate second valve member, and the first and second valve members are positioned within the valve body and the sleeve means so as to extend coaxially along a common axis and to effect movements between their respective open and closed positions by moving axially along said common axis.

9. The handle operated flow control valve of claims 2, 3, 4, 5 or 6 wherein:

a) the first biasing means includes a first compression coil spring;

b) the second biasing means includes a second compression coil spring;

c) the first valve means includes a first valve member having an elongate first stem portion about which portions of the first compression coil spring extend;

d) the second valve means includes a second valve member having an elongate second stem portion about which portions of the second compression coil spring extend;

e) the first and second stem portions are positioned within the valve body and the sleeve means so as to extend coaxially along a common axis and to position the first and second compression coil springs to also extend coaxially along a common axis, with the valve body and the sleeve means being configured to cooperate with the first and second valve members to confine movements of the first and second valve members to movements that extend along said common axis.

10. The handle operated flow control valve of claims 1, 2, 3, 4, 5 or 6, wherein the lost motion connection means includes interfitting formation means that are connected to the first valve means and to the second valve means for permitting relative movement between the first valve means and the second valve means when the handle is moved within said initial part of its permitted range of movement, and for abuttingly engaging to cause movement in unison of the first valve means and the second valve means when the handle is moved within said remaining part of its permitted range of movement.

* * * * *